United States Patent Office 3,371,038
Patented Feb. 27, 1968

3,371,038
SOLID LUBRICANT COMPOSITION AND METHOD OF MANUFACTURING SAME
Ladislav E. Wieser and Bobby D. McConnell, Dayton, Ohio, assignors to the United States of America as represented by the Secretary of the Air Force
No Drawing. Filed Oct. 10, 1966, Ser. No. 586,317
14 Claims. (Cl. 252—28)

The invention described herein may be manufactured and used by or for the United States Government for governmental purposes without payment to us of any royalty thereon.

The present invention relates to a metal adherent solid lubricant composition which comprises a mixture of dry lubricant particles and an inorganic binder.

In the past, dry or solid lubricant materials such as the heavy metal sulfides have been admixed with a variety of resinous or inorganic binders and applied to bearings or other metal surfaces whereon there is a need for a lubricating film. While such solid lubricant coatings have had the advantage of being somewhat permanently associated with the metal components in contradistinction to the more fugitive conventional oils and greases, it is not surprising that the solidity and permanency of such films have militated against their lubricity, low coefficient of friction and anti-seizing properties. But this is not to say that completely satisfactory bonding of the solid lubricant films to the metal surfaces has been achieved in the prior art, particularly where the lubricated components are ultimately subjected to environmental extremes of high or low pressures, partial or complete vacuums or extremely high temperatures. As a matter of fact, the use of the known solid lubricant films on the components of high speed and high altitude aircraft, rocket engines, aerospace vehicles and the like which must encounter such extreme environments has been seriously limited by the premature degradation or destruction of the film and the untimely loss of the benefits of the lubricating ingredients therein. As noted above, previous attempts to provide a film which will hold fast to a metal surface after exposure to elevated temperatures of from 250 to 1100 degrees Fahrenheit or to high vacuum environments have impaired the lubricating capability of the film thereby not only destroying the efficiency of the components so lubricated but also severely, and in most cases, critically reducing their wear life.

It is accordingly an object of the present invention to provide an improved metal adherent solid lubricant composition.

Still another object of the invention is to provide such a composition which will have excellent lubricating and anti-seizing properties combined with a very low coefficient of friction in sliding motion and will, at the same time, remain adhered to metal surfaces to which it has been applied when exposed to elevated temperatures of from 250 degrees Fahrenheit to 1100 degrees Fahrenheit in vacuum or near-vacuum conditions and even while the lubricated components are operating at high speeds and under heavy loads.

Yet another object of the present invention is to provide a novel film-forming binder of inorganic materials which will not deleteriously affect the lubricating qualities of the dry lubricant which is admixed with it.

Still another object of the invention is to provide a method for the manufacture of the novel solid lubricant compositions.

Other objects and advantages of this invention residing in the novel features of the steps and combinations of components, will become more apparent from the description of the specific examples hereinafter following. It will be understood that certain features of the invention may be utilized other than as exactly disclosed.

The invention however is not intended to be restricted to any particular step or steps and/or combination or components, or any particular application of such steps and/or combination or components, or any specific method, or any of the various details thereof, even where specifically set forth and described herein, as the same may be modified in various particulars or may be applied in varied relations without departing from the spirit and scope of the claimed invention, practical examples embodying certain details of the invention being set forth, but only for the purpose of complying with the requirement of the statute for disclosure of operative methods, but without attempting to disclose all of the various limits and modifications in which the invention might be embodied.

Although such novel features as are believed to be characteristic in the invention are pointed out in the claims, the invention as to its objects and advantages and the manner in which they are carried out, may better be understood by reference to the examples and the following information. The process of the present invention is in particular adapted to the application of dry lubricant coatings or films to hardened or unhardened metal surfaces and particularly to those of steel or steel alloys.

To achieve these and other objects and advantages which will appear from a reading of the following disclosure, the present invention teaches a solid lubricant composition, the total weight of which is made up of from 40 to 50 weight percent of molybdenum disulfide, from 19 to 23 weight percent of lead sulfide, from 2 to 5 weight percent of calcium nitrate and from 28 to 32 weight percent of a binder or bonding ingredient which is itself composed as follows. The total weight of the bonding composition comprises from 30 to 40 weight percent of silicon dioxide, from 18 to 22 weight percent of sodium carbonate, from 5.5 to 7.5 weight percent of aluminum trioxide, from 1.5 to 3.5 weight percent of calcium oxide, from 2 to 5 weight percent of lithium nitrate, from 26 to 30 weight percent of $K_2B_4O_7 + 5H_2O$, from 0.9 to 1.0 weight percent of cobalt trioxide and from 0.9 to 1.0 weight percent of cadmium oxide. In a modification, the cadmium oxide may be replaced in the same weight ratio by nickel oxide.

*Example I*

In the preparation of a specific bonding composition of inorganic agents according to the present invention, the following ingredients in powdered or particulate condition are thoroughly mixed in dry form:

| Ingredient: | Percent by weight |
|---|---|
| Silicon dioxide | 36.61 |
| Sodium carbonate | 20.63 |
| Aluminum trioxide | 6.56 |
| Cobalt trioxide | 0.95 |
| Cadmium oxide | 0.95 |
| Calcium oxide | 2.34 |
| Lithium nitrate | 3.75 |
| $K_2B_4O_7 + 5H_2O$ | 28.2 |

The above ingredients thoroughly admixed are placed in a furnace or oven which has been previously heated to 2200 degrees Fahrenheit and are there held for twenty minutes until the mixture becomes molten and colorless, whereupon it is poured into cold distilled water and turns deep blue. Upon removal from or removal of the water, a light and frangible frit is present which is then placed in a drying oven at 250 degrees Fahrenheit for 16 hours. After drying, the frit is then pulverized in a suitable mill or other grinding apparatus to a fine binder powder passing a Number 325 mesh sieve or until it has a particle size on the order of 44 microns at which point it is ready to be admixed with the dry lubricant components which are combined with the above described binder powder according to the following recipe:

| Ingredient: | Percent by weight |
| --- | --- |
| Molybdenum disulfide | 45.6 |
| Lead sulfide | 21.4 |
| Calcium nitrate | 3.6 |
| Binder powder (as above) | 29.4 |

The solid lubricant materials are also in dry powder form and are preferably of a size to pass a Number 325 mesh screen. After the lubricant and binder powders have been dry mixed, they may be dispersed, suspended or dissolved in a suitable amount of distilled water to achieve a liquidity which lends itself for spraying, painting or immersing operations. For best results it has been found that the aqueous solution should be thoroughly mixed by stirring for from four to five hours before application of the lubricant and at least intermittently during the application.

Where the specific lubricant-binder composition set forth above is admixed with distilled water in the weight ratio of one part per weight of the dry lubricant-binder ingredients to three parts by weight of the water to achieve a mixture of spraying consistency, a sprayable mixture is achieved which may be applied by an air brush operating under fifty-five pounds per square inch of pressure to a stainless steel or other metal bearing surface. While this simple air brush spraying or comparable coating of the metal parts to be lubricated as by dipping or painting provides an adherent film which exhibits improved lubricating and structural properties, still greater improvements, particularly with regard to wear-life, are achieved where the coating thus applied is densified at least upon the outer surface thereof. This densification may be accomplished by pressing the coating after it has been applied to the metal surface either before or after the coating has been heated or sintered. One such method for mechanically densifying the coating involves compressing the same by rolling it with a polished metal roller such as a polished stainless steel roller under high compressive stresses on the order of 40,000 pounds per square inch.

In still a more preferred method for applying the coating of this composition however, the densification thereof is achieved by first applying a base coat or film by spraying, dipping or brushing until a film thickness of from .0008 to .0012 inch is achieved. This base coat is then heated to sintering temperatures within the range of from 1400 to 1450 degrees Fahrenheit, as for example in an electric oven and preferably in an inert atmosphere such as one of dry nitrogen gas, until the base coat is fused or sintered. After this operation, the fused coating is cooled down to a temperature of from 70 to 250 degrees Fahrenheit whereupon a second or top layer composed of three parts by weight of molybdenum disulfide and one part by weight of boric oxide dispersed or suspended in a suitable amount of propanol alcohol or of isopropyl alcohol is applied by electrostatic means such as electrophoretic deposition, electrostatic spraying, glow-discharge bombardment or the like until an additional thickness of on the order of .001 inch is added. After this second coating has been so applied, the substrate with both of the film layers thereon is again heated to elevated temperatures ranging between 1350 to 1400 degrees Fahrenheit in the same manner and preferably under the same conditions as was the first coating. While this two-step method of coating wherein the application of each coat is followed by a sintering operation, provides a film which has improved density and a resultant improved wear-life, still greater density and wear-life can be achieved where the final coating, after it has been sintered and cooled to at least 250 degrees Fahrenheit, is polished with a quartz or polished steel surface.

While the within invention has been described in connection with certain specific embodiments and preferred examples thereof, it is to be understood that the foregoing particularization has been for the purpose of illustration only and does not limit the scope of the invention as it is defined in the subjoined claims.

We claim:
1. A metal adherent solid lubricant composition comprising a major proportion by weight of a dry solid lubricant material and a lesser proportion by weight of a binder composed of silicon dioxide, sodium carbonate, aluminum trioxide, cobalt trioxide, calcium oxide, lithium nitrate, $K_2B_4O_7+5H_2O$ and one of that class of materials which consists of nickel oxide and cadmium oxide.

2. A solid lubricant composition according to claim 1 wherein said dry solid lubricant material comprises from 68 to 72 weight percent and said binder powder comprises from 28 to 32 weight percent of the total composition.

3. A solid lubricant composition according to claim 1 wherein said dry solid lubricant material is one or more of that class thereof which consists of molybdenum disulfide, lead sulfide and calcium nitrate.

4. A solid lubricant composition according to claim 3 where the total weight of the composition comprises from 40 to 50 weight percent of molybdenum disulfide, from 19 to 23 weight percent of lead sulfide and from 2 to 5 percent by weight of calcium nitrate.

5. A lubricant composition according to claim 4 wherein 29.4 weight percent of the total lubricant-binder composition is composed of said binder, 45.6 weight percent of the total composition is molybdenum disulfide, 21.4 weight percent of the total composition is lead sulfide and 3.6 weight percent of the total composition is calcium nitrate.

6. A solid lubricant composition according to claim 1 wherein the total weight of the binder material is from 30 to 40 weight percent silicon dioxide, from 18 to 22 weight percent sodium carbonate, from 5.5 to 7.5 weight percent aluminum trioxide, from 0.9 to 1.0 weight percent cobalt trioxide, from 1.5 to 3.5 weight percent calcium oxide, from 2 to 5 weight percent lithium nitrate, from 26 to 30 weight percent $K_2B_4O_7+5H_2O$ and from 0.9 to 1.0 weight percent of that class of materials which consists of cadmium oxide and nickel oxide.

7. A binder for holding particulate dry lubricant materials in a film upon a metal substrate comprising from 30 to 40 weight percent silicon dioxide, from 18 to 22 weight percent sodium carbonate, from 5.5 to 7.5 weight percent aluminum trioxide, from 0.9 to 1.0 weight percent cobalt trioxide, from 1.5 to 3.5 weight percent calcium oxide, from 2 to 5 weight percent lithium nitrate, from 26 to 30 weight percent $K_2B_4O_7+5H_2O$ and from 0.9 to 1.0 weight percent of that class of materials which consists of cadmium oxide and nickel oxide.

8. A binder for holding particulate dry lubricant materials in a film upon a metal substrate comprising 36.61 weight percent of silicon dioxide, 20.63 weight percent of sodium carbonate, 6.56 weight percent of aluminum trioxide, .95 weight percent of cobalt trioxide, 2.34 weight percent of calcium oxide, 3.75 weight percent of lithium nitrate, 28.2 weight percent of $K_2B_4O_7+5H_2O$ and .95 weight percent of one or a mixture of that class of materials which consists of cadmium oxide and nickel oxide.

9. A method for the manufacture of a solid lubricant composition comprising admixing selected inorganic dry binder ingredients in powdered form, sintering the dry powdered mixture to form a frit, pulverizing the frit and admixing the pulverized frit with a dry particulate solid lubricant material.

10. A method according to claim 9 wherein said inorganic binder ingredients are sintered at a temperature of 2200 degrees Fahrenheit for twenty minutes.

11. A method according to claim 9 wherein said frit is formed by pouring the sintered binder ingredients in cold water.

12. A method for the manufacture of a solid lubricant composition according to claim 9 wherein the total weight of said inorganic dry binder ingredients comprises from 30 to 40 weight percent of silicon dioxide, from 18 to 22 weight percent of sodium carbonate, from 5.5 to 7.5 weight percent of aluminum trioxide, from 0.9 to 1.0 weight percent of cobalt trioxide, from 1.5 to 3.5 weight percent of calcium oxide, from 2 to 5 weight percent of lithium nitrate, from 26 to 30 weight percent of $K_2B_4O_7 + 5H_2O$ and from 0.9 to 1.0 weight percent of one or a mixture of that class of materials which consists of cadmium oxide and nickel oxide.

13. A method for the manufacture of a solid lubricant composition according to claim 9 wherein the total weight of the dry particulate solid lubricant material is composed of one or more of that class thereof which consists of molybdenum disulfide, lead sulfide and calcium nitrate.

14. A method according to claim 13 wherein the total weight of said solid lubricant material comprises from 40 to 50 weight percent of molybdenum disulfide, from 19 to 23 weight percent of lead sulfide and from 2 to 5 weight percent of calcium nitrate.

References Cited

UNITED STATES PATENTS

| | | | |
|---|---|---|---|
| 2,990,373 | 6/1961 | Ragborg | 252—25 |
| 2,990,610 | 7/1961 | Luckerath et al. | 252—25 |
| 3,288,710 | 11/1966 | Hollitz | 252—25 |

DANIEL E. WYMAN, *Primary Examiner.*

I. VAUGHN, *Assistant Examiner.*